United States Patent [19]

Carvalho et al.

[11] 4,098,316
[45] Jul. 4, 1978

[54] BEAD STRUCTURE FOR PNEUMATIC TIRES

[75] Inventors: Robert L. Carvalho; Gustav E. Benson, both of Newark, Ohio

[73] Assignee: Owens-Corning Fiberglas Corporation, Toledo, Ohio

[21] Appl. No.: 749,510

[22] Filed: Dec. 10, 1976

[51] Int. Cl.² .............................................. B60C 15/04
[52] U.S. Cl. ................................. 152/362 R; 156/136; 245/1.5
[58] Field of Search ............. 152/362 R, 362 CS, 354, 152/356, 359; 245/1.5; 156/136

[56] References Cited

U.S. PATENT DOCUMENTS

| 2,822,141 | 2/1958 | Robson | 152/362 R |
| 2,952,293 | 9/1960 | Billingsley | 152/362 R |
| 3,106,952 | 10/1963 | Rudder | 152/362 R |
| 3,269,444 | 8/1966 | Willis | 152/362 R |
| 3,473,595 | 10/1969 | Marzocchi et al. | 152/354 |
| 3,500,888 | 3/1970 | Boileau | 152/359 |
| 3,942,574 | 3/1976 | Bantz | 152/362 R |

Primary Examiner—Drayton E. Hoffman
Assistant Examiner—Carl Rowold
Attorney, Agent, or Firm—Ronald C. Hudgens; Greg Dziegielewski; Philip R. Cloutier

[57] ABSTRACT

A bead ring for a pneumatic tire comprising strands of glass filaments and at least one metallic wire in an elastomeric matrix.

2 Claims, 4 Drawing Figures

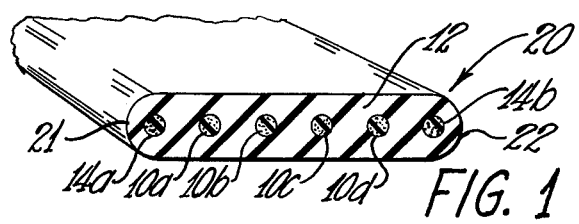
FIG. 1
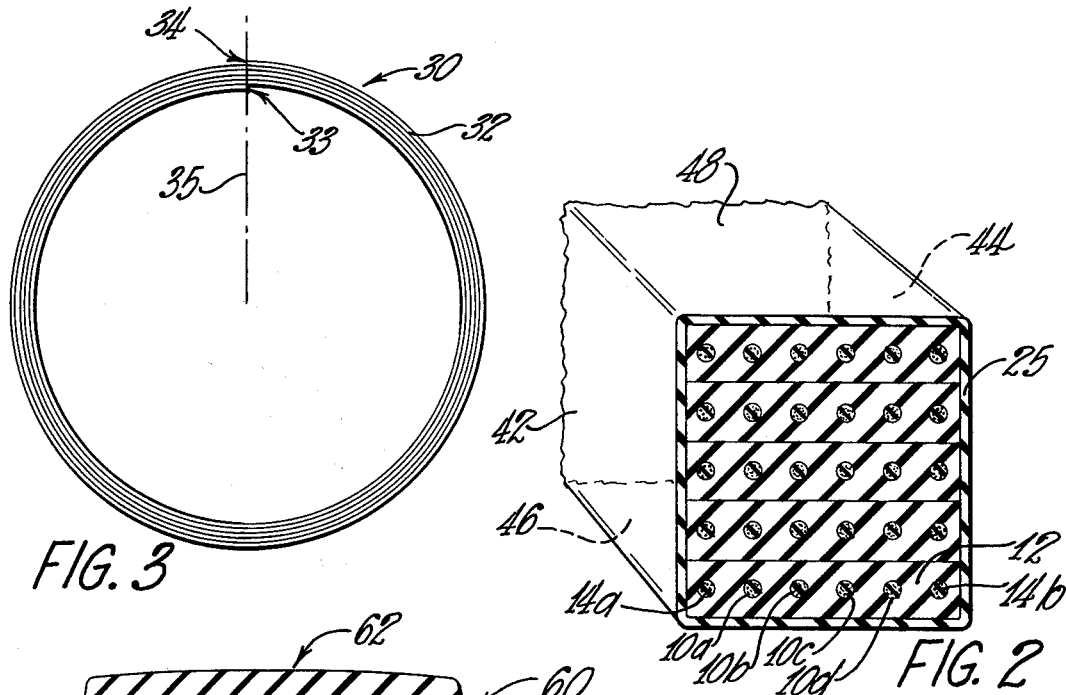
FIG. 3
FIG. 2
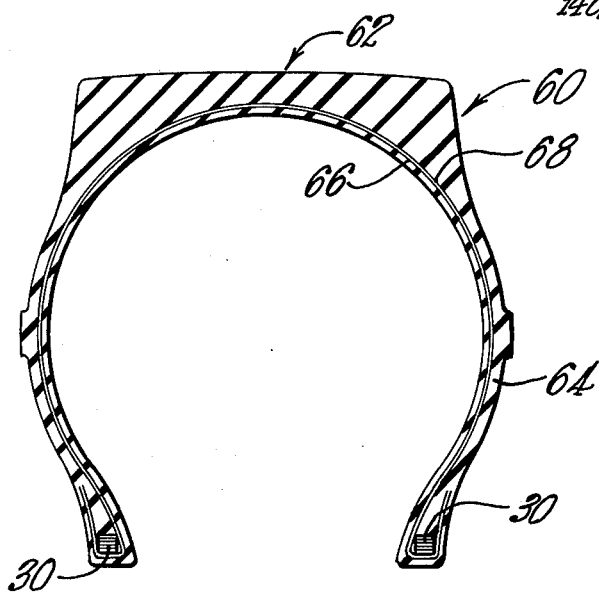
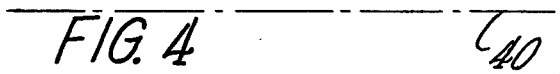
FIG. 4

BEAD STRUCTURE FOR PNEUMATIC TIRES

BACKGROUND OF THE INVENTION

The bead portion of the tire is a particularly critical component by reason of its role as the primary connector, as it were, between the wheel of the vertical and the ground-contacting tread.

Traditionally, bead members have been formed of metal wire which is combined with rubber in an extruding operation, followed by a forming of the bead ring with an appropriate number of winds of the metal wire and a wrapping of the assembly with a friction-coated textile wrap, otherwise known as bead stock.

Glass fibers have been suggested and employed in the manufacture of bead members. For example, U.S. Pat. Nos. 3,612,139 Marzocchi et al., 3,473,595 Marzocchi et al., and 3,237,674 Budd et al. teach using glass fibers as a tire bead reinforcement. As these references point out, glass cannot be simply substituted for another reinforcing material. The different properties and characteristics of the glass must be considered in the design. Furthermore, the geometry of the placement of the glass within the bead must be considered. It is believed that hoop stiffness is an important characteristic relating to the quality of bead performance in the tire. Hoop stiffness is the ability of the bead to resist deformation from its circular shape. A lack of sufficient loop stiffness of the bead is believed to have contributed to the peculiarities of early glass beads.

A sufficient degree of hoop stiffness is desirable for proper bead performance in a tire and for ease of handling during fabrication. The conventional all steel wire reinforced bead ring is generally much stiffer than is absolutely necessary.

SUMMARY OF THE INVENTION

According to this invention, there is provided a bead ring for a pneumatic tire comprising an elastomeric material having at least one metal member at each lateral edge of the ring and a continuous glass strand interposed therebetween.

Furthermore, according to this invention, the lack of hoop stiffness, or bead limpness, in fiber glass reinforced beads is overcome by incorporating at least a single metal wire in the bead.

Accordingly, it is a general object of the present invention to provide a bead ring construction for a pneumatic tire having a greater degree of hoop stiffness than similar all-glass reinforced bead rings.

It is another object of the present invention to provide a bead ring construction which utilizes strands of continuous glass filaments in conjunction with metal wire in a particular geometric relationship as a reinforcement medium.

The foregoing, as well as other objects of the present invention, will become apparent to those skilled in the art from the following detailed description.

DESCRIPTION OF THE DRAWINGS

FIG. 1 is a perspective sectional view of an elastomeric member used in forming the bead structure.

FIG. 2 is a perspective sectional view of a bead structure in accordance with one embodiment of the present invention.

FIG. 3 is a schematic side elevational view illustrating the convolutions or the spiral disposition, shown in single line, of a bead and further illustrating the winding of the elongate band used in forming a bead in accordance with a preferred embodiment of the present invention.

FIG. 4 is a sectional view of a tire illustrating a tire construction incorporating the present invention.

DESCRIPTION OF THE PREFERRED EMBODIMENTS

Generally speaking, a glass strand is a bundle or plurality of individual glass fibers or filaments as gathered together following attenuation of the filaments. The number of filaments in a strand may vary up to several thousand. As the filaments are drawn together, they have applied to them a size composition preferrably containing ingredients adapted to impart to the glass surface the ability to adhere to the ultimate rubber stock or to an intermediate impregnant. The size also acts as a protective coating for the filaments. Any suitable size can be used, such as described in Lin, U.S. Pat. No. 3,816,235. These filaments then are collected into a bundle and are then wound upon a spool.

Similar strands can be combined with or without twist to form yarns which, in turn, can be plied and combined with like yarns, with or without twist, to form the cords or bundles. The yarns, strands and/or cords or bundles composed of a plurality of strands and/or yarns are desirably additionally treated with an elastomeric impregnant to assist in the attachment of the glass to the surrounding rubber matrix in the tire construction. Impregnation may be accomplished by simply immersing the yarn, or cord, or a plurality thereof in array, into a suitable impregnant such as described in Uffner, U.S. Pat. No. 3,787,224, and then removing excess impregnant from the strand.

The impregnated cords can then be dried to decrease tackiness and, at the same time, to achieve a partial vulcanization of the elastomeric component of the impregnant.

The impregnated strand or cord is next combined with a suitable elastomeric matrix, or rubber, and metallic wire and extruded into a band or tape-like element similar to that shown in FIG. 1.

FIG. 1 is a schematic cross-sectional view of the extruded band, or tape-like, element 20. The band 20 consists of metal or metallic wires 14a and 14b and continuous glass strands 10a, 10b, 10c and 10d embedded in the elastomeric rubber matrix 12. A metal wire is located at both lateral edges, 21 and 22 respectively. The strands of continuous glass filaments 10a, 10b, 10c and 10d are located substantially parallel to, and in side-by-side relation with, each other and the metal wires 14a and 14b throughout the length of the band. The wires and strands essentially have a common center line and are equally spaced apart relative to each other.

Any suitable glass strand or cord may be employed. A twisted strand having 1.5 twists per inch of strand length and consisting of four substrands, each having approximately 2052 "G" size continuous glass filaments has been found to be suitable when used in a band similar to that shown in FIG. 1.

The metallic wire 14 may be the type generally used for the conventional metallic wire reinforced bead ring. This is generally a bronze coated, steel wire.

Conventional extrusion, calendaring and drum winding operations can be employed to embed the glass strands and metallic wires in an elastomeric matrix of appropriate configuration.

FIGS. 2 and 3 illustrate an embodiment of the invention. The continuous band or tape-like element 20 is convolutely wound such that 5 layers of band 20 are laid one upon another. This results in a 6 × 5 construction; that is, there are a total of six strands and wires in each layer of band, and a total of five layers of band. The spiral configuration generally defines a hoop-like structure. This configuration is shown schematically and in side elevation in FIG. 3 wherein the band is defined by reference numeral 32. The opposite ends of the single length of band are identified respectively by the reference numerals 33 and 34 and are not overlapped but rather are radially aligned as designated by the dotted line 35.

As shown in FIG. 2, the convolutely wound band 20 of elastomeric matrix material 12 is wrapped with a skin-coated fabric wrap 25, otherwise known as bead stock. The fabric wrap and its use are also well known in the art.

It has been found that, basically, the process and equipment used for manufacturing the conventional all steel wire reinforced bead ring may be used for manufacturing the composite bead ring described above.

The bead ring formed, shown as an enlarged section in FIG. 2, is a hoop-like structure having two lateral edges or surfaces 42 and 44, respectively, an inner surface 46, and an outer surface 48. Each lateral edge generally defines or lies in a plane perpendicular to the axis of rotation 40 of bead ring 30 in tire 60, referring to FIGS. 2 and 4.

Since the band is convolutely wound, the metal wires 14a and 14b, each, generally form a spirally shaped element in the resulting bead ring. The wires in such spiral orientation define planes substantially parallel to lateral surfaces 42 and 44. Between such wires there is at least one strand or cord of continuous glass filaments, but a plurality of such strands or cords is preferred.

The reinforcement of the band or tape-like element need not be limited to merely the configuration shown in FIGS. 1 and 2; that is, there may be more or less than two metal wires and four glass strands in suitable locations in the band. For example, a single metal wire or member can be suitable for stiffening the otherwise all glass strand reinforced bead ring. However, it is believed that having a metal wire along the lateral edge or edges of the bead ring offers an advantage over one without the metal wire at the edge or edges. During tire fabrication automated equipment can shove axially against the lateral edge or shoulder of the bead ring and a steel wire embedded at such an edge helps promote the stiffness desired for ease of fabrication of the tire.

The somewhat schematic section view of FIG. 4 shows a bead located in a tire 60 of conventional construction. The tire includes a tread 62 carried by the torodial carcass or body 64, and an inner carcass ply 66 and an outer carcass ply 68, each having respective turnups about bead ring 30. A bead ring reinforces the carcass at each of the wheel engaging portions thereof.

It will be appreciated that variations and constructional features, as well as substitution of equivalent components, can be undertaken without departing from the spirit and scope of the present invention.

What we claim is:
1. A bead ring for a pneumatic tire having
a structure comprising an elastomeric material having a plurality of metal members and at least one strand of continuous glass filaments positioned between the metal members, each lateral edge of the structure having at least one of the members located therein.
2. The bead ring of claim 1 wherein the structure is a convolutely wound band of elastomeric material, the band having the strand of glass filaments and the metal members in substantially parallel relationship throughout the length of the band.

* * * * *